(12) United States Patent
Peter et al.

(10) Patent No.: US 8,330,450 B2
(45) Date of Patent: Dec. 11, 2012

(54) MAGNETIC POSITION SENSOR

(75) Inventors: Gerhard Peter, Sulz (AT); Werner Dengler, Nueziders (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 604 days.

(21) Appl. No.: 12/515,299

(22) PCT Filed: Nov. 16, 2007

(86) PCT No.: PCT/EP2007/009931
§ 371 (c)(1),
(2), (4) Date: Jun. 29, 2009

(87) PCT Pub. No.: WO2008/058751
PCT Pub. Date: May 22, 2008

(65) Prior Publication Data
US 2010/0033167 A1    Feb. 11, 2010

(30) Foreign Application Priority Data

Nov. 18, 2006  (DE) .......................... 10 2006 054 409
May 10, 2007   (DE) .......................... 10 2007 022 451

(51) Int. Cl.
*G01P 3/48* (2006.01)
(52) U.S. Cl. ............ 324/166; 324/160; 324/207.21
(58) Field of Classification Search ............ 324/207.13, 324/207.21
See application file for complete search history.

(56) References Cited

U.S. PATENT DOCUMENTS

| 5,798,640 A | 8/1998 | Gier et al. ............... 324/207.24 |
| 6,070,337 A | 6/2000 | Wallrafen ....................... 33/708 |
| 2003/0145653 A1 | 8/2003 | Kramp ............................ 73/314 |
| 2007/0152658 A1 | 7/2007 | Pauer ..................... 324/207.13 |

FOREIGN PATENT DOCUMENTS

| DE | 4339931 | | 3/1995 |
| EP | 0844459 B1 | * | 4/2003 |
| EP | 1491771 | | 12/2004 |
| WO | WO03044470 | * | 5/2003 |
| WO | WO-03044470 | | 5/2003 |

* cited by examiner

*Primary Examiner* — Melissa Koval
*Assistant Examiner* — Trung Nguyen
(74) *Attorney, Agent, or Firm* — Andrew Wilford

(57) ABSTRACT

A magnetic position sensor consisting of a non-electroconductive, non-magnetic carrier on which a resistive layer is arranged, in addition to a pick-off layer which is located at a distance from the resistive layer and at least partially overlaps the same. The distance between the two layers is selected in such a way that contact is established between the two layers by a magnetic device that can be moved along the overlapping regions of the resistive layer and the pick-off layer. The pick-off layer is a film which consists of a ferromagnetic material and is electroconductive at least on one side. The pick-off layer is a film which consists of a ferromagnetic material and is electroconductive at least on one side.

12 Claims, 5 Drawing Sheets

MAGNETIC POSITION SENSOR

CROSS REFERENCE TO RELATED APPLICATIONS

This application is the US national phase of PCT application PCT/EP2007/009931, filed 16 Nov. 2007, published 22 May 2008 as WO2008/058751, and claiming the priority of German patent application 102006054409.9 itself filed 18 Nov. 2006 and PCT patent application PCT/EP2007/009931 itself filed 16 Nov. 2007, whose entire disclosures are herewith incorporated by reference.

BACKGROUND OF THE INVENTION

The invention relates to a magnetic position sensor, consisting of a dielectric and nonmagnetic support carrying a resistive layer in addition to a contact layer spaced from and at least partially overlying the resistive layer, the spacing being such that contact is made between the two layers by a magnet that can be moved along the overlying regions of the resistive layer and the contact layer.

Position sensors detecting the position of an element relative to a reference position are generally known. An example of such a position sensor is disclosed in DE 43 39 931. However, this position sensor has the disadvantage that it operates mechanically under pressure such that the position sensor is subjected to a high degree of wear and tear.

In order to reduce the wear effect, magnetic position sensors have been known, such as from DE 196 48 539 [U.S. Pat. No. 6,070,337] or DE 10 2004 004 102 [US 2007/0152658].

A generic, passive magnetic position sensor is known from DE 195 26 254 [U.S. Pat. No. 5,798,640]. This position sensor consists of a dielectric and nonmagnetic support carrying a resistive layer in addition to a contact layer spaced from and at least partially overlying the resistive layer. The contact layer is a bending beam structure shaped like a meander and mounted between two spacers. The spacing between the contact layer and the resistive layer is selected such that with the effect of a magnet, in this case a permanent magnet that can be moved along the overlying regions of the resistive layer and the contact layer, contact is created between the resistive layer and the contact layer, thus resulting in a detectable change of resistance upon application of an electric current on the resistive layer that represents a measure of the relative position of the permanent magnet with respect to the position sensor.

Although such a sensor will reduce the wear effects to a minimum, it is still disadvantageous with regard to the extensive construction thereof, since the contact layer can be produced only at great effort in the shape of a bending beam structure having a meander shape. Furthermore, it is necessary to mount the meander-shaped bending beam structure between two spacers, providing a further disadvantage in that the meander-shaped bending beam structure may be damaged during operation of the position sensor due to mechanical stresses.

OBJECT OF THE INVENTION

The object of the invention is therefore to provide a magnetic position sensor that operates free of any wear and that is improved with respect to its manufacture. In particular, the invention seeks to reduce the installation height of such a position sensor and also to simplify its manufacture.

SUMMARY OF THE INVENTION

This object is attained according to the invention in that the contact layer is a film consisting of a ferromagnetic material, and is electrically conductive at least on one face. The use of a film of ferromagnetic material as the contact layer has the advantage that the film is substantially more robust with regard to mechanical outside influences on the position sensor, and such a film is substantially easier to produce (as opposed to a meander-shaped bending beam structure) and easier to handle during production. Since the contact layer consists of ferromagnetic material, it may optimally be used in the region of the magnetic effect on the resistive layer such that the desired detectable change of resistance results. In this manner it is possible to use a smaller magnet and to reduce the installation height of the position sensor, since the smaller magnet may be brought closer to the position sensor. Furthermore, with appropriate shaping of the support, the resistive layer and the contact layer may be mounted on the support, e.g. attached thereto, such that the required spacers known from the prior art may be omitted. This also results in a reduction of the installation height of the entire position sensor.

The support, resistive layer, contact layer and a cover of the support are formed from a rigid or flexible film in a particularly advantageous manner, thus reducing the entire installation height of the position sensor.

In a further embodiment of the invention the contact layer is protected by a cover that is connected to the support of the position sensor. In this manner simple manufacture of the position sensor is possible, since to start with the support is made and equipped with a resistive layer, subsequently the contact layer is applied, and then the entire arrangement of the already functional position sensor is protected from outside influences by an additional cover. This further has the advantage that a position sensor may be produced this way of any desired length. If these elements of the position sensor consist of a flexible film, it is further possible in an advantageous manner to produce, for example, the basic shape of the position sensor on a roll in this manner, the continuous material being simply cut off depending on the desired length of the position sensor to be produced, and may further be processed into a finished position sensor. The further processing is carried out by attaching end pieces to the ends of the cut-off piece of the position sensor, a cable being connected to one of the end pieces and there connected to the resistive layer and the contact layer, a plug-in connector being provided at the end of the cable, for example, which, however, is not mandatory. The position sensor may be connected to an analysis unit via the plug-in connector, to which the position sensor is connected, and that is set up to detect the changes of resistance in a relative movement of the magnet to the position sensor.

In a further embodiment of the invention it is essential that the cover be a flux-conducting plate, or have a flux-conducting plate. Such a flux-conducting plate can increase the magnetic effect and enhance the sensitivity of the position sensor, or the magnetic force of the magnet, and thus the size thereof. In this embodiment it is conceivable that the cover is, for example, a plastic housing in which a suitable flux-conducting plate is provided and attached. The attachment may be carried out, for example, by gluing or caulking. Furthermore, it is conceivable to produce the cover in an injection-molding process, the flux-conducting plate being at least partially, or particularly also completely, injection molded together with the plastic material that forms the cover. As an alternative it is further conceivable that the cover be a rigid plastic part or a flexible plastic part, particularly a film, the flux-conducting plate being formed by an element that is an integral part whose position is to be detected. One example is that the position sensor is attached to a seat rail of a seat of a vehicle so the magnet is moved relative to the position sensor that is attached, for example to the chassis (frame) of the vehicle.

In a further embodiment of the invention a combination of a contact layer (sensor film) and a resistive layer is used on an opposite partner film. The resistive side is constructed in the following manner: the base is a ferromagnetic film. It is thinly coated using a dielectric. This in turn is thinly coated using a resistive varnish. The sensor film and the partner film form contact springs and a coil together with the resistance path applied. Contact is made by a magnetic field acting from the outside, which is generated by a permanent magnet that has been placed nearby, or is electrically generated in an associated magnetic coil. The two contact guides (peak and trough) attract one another due to the magnetic field, contact each other at their crowns, and thus close the electric circuit in which the resistive layer is located. As soon as the magnetic field drops, or falls below a certain force (particularly if the magnet is moved away perpendicularly from the position sensor) the contact reopens due to the spring effect, e.g. the trough separates from the peak. Since the contact guides are energized only in the region of the magnet, a potentiometer-like circuit is formed. However, if the magnet moves longitudinally relative to the position sensor, the wave of the contact layer and/or of the resistive layer rolls across longitudinally along the position sensor.

The position sensor according to the invention may have the following applications (without claiming everything):
  linear and rotational 360°
  linear, also axially wound about a shaft
  Form of installation: straight, wavy, curved, 3D installation
  Sensor is fixed and magnet is moved, or vice versa
  Use preferably in vehicles in:
  sunroof
  seat adjustment
  cargo base
  sliding door
  door
  hatch
  convertible roof
  cylinder, hydraulic and gas
  fender, spoiler adjustment
  window
  gearstick, joystick
  strut
  fluid level
  back rest
  lock angle
  pedal travel and angle
  switch fuzzy logic
  Possible configurations:
  straight
  nonstraight
  wavy
  curved
  linear
  rotational In an alternate embodiment of the invention it is conceivable that the resistive layer and/or the contact layer are configured in the shape of a finger. The fingers are project transversely from an elongated position sensor and overlie each other at least partially so that they may engage each other on the action of the magnetic field of the magnet. The fingers—or a comb-shaped embodiment of the resistive layer, or of the contact layer are present only, for example, in the side end region (e.g. facing away from the region in which, for example, the contact layer is clamped into the spacer), or may also project toward or even into the region in which the respective layer is attached to the respective element.

Another substantial advantage of the position sensor according to the invention is that due to the construction and material choice thereof, sticking of the resistive layer to the contact layer will not occur, even if the magnet has been located at the same location for a longer period of time. In this regard it should be mentioned by way of example that the position sensor can be attached to a seat rail of a seat of a vehicle so the position of the seat with respect to the chassis of the vehicle can be detected by the position sensor. To this end the magnet is attached to the seat. In this case it would be conceivable that the seat is not moved over a longer period of time, since the vehicle is always controlled by the same driver. If the seat is moved away from the initial set position after a long period of time, there is no worry that the deflected wave (trough or peak) of the contact layer gets stuck to the resistive layer. Due to the changing magnetic field as a result of the displacement of the seat the peak or the trough also move away from the original position thereof such that the contact layer thereby do not get stuck to the resistive layer although they have engaged each other for the purpose of detecting the position, and thus of the resistance of the position sensor.

BRIEF DESCRIPTION OF THE DRAWING

The above and other objects, features, and advantages will become more readily apparent from the following description, reference being made to the accompanying drawing in which.

DETAILED DESCRIPTION

Figure 1:
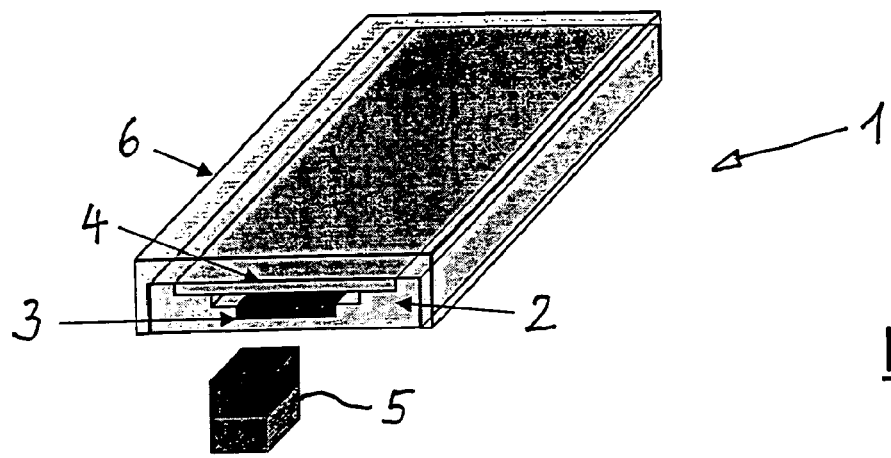
FIG. 1 is a diagrammatic perspective view of a sensor according to the invention.

In the figures, inasmuch as details are illustrated, a magnetic position sensor is shown at 1. FIG. 1 shows that the position sensor 1 consists of a dielectric and nonmagnetic support 2 on which a resistive layer 3 is mounted or attached and, at a spacing therefrom, a contact layer 4 is provided that at least partially overlies it. The resistive layer 3 is set, for example, in a recess in the support 2, additional shoulders of the support 2 also carrying the contact layer 4 in the form of a film made of ferromagnetic material. The two layers 3 and 4 may be calendered, glued, or such, for example, laterally, partially, or completely to the support 2. Furthermore, a magnet is provided in the form of a permanent magnet 5 that can be moved relative to the position sensor 1. The elements of the position sensor described thus far are protected by a cover 6 that may also consist, for example, of a dielectric and non-magnetic material, and may be connected to the support 2, for example, at its edges. Furthermore, the upper part of the cover 6 is made of a flux-conducting plate in order to increase the magnetic effect of the magnet 5, thus resulting in an advantageous manner in the fact that the entire position sensor 1 may be made flatter.

Figure 2:
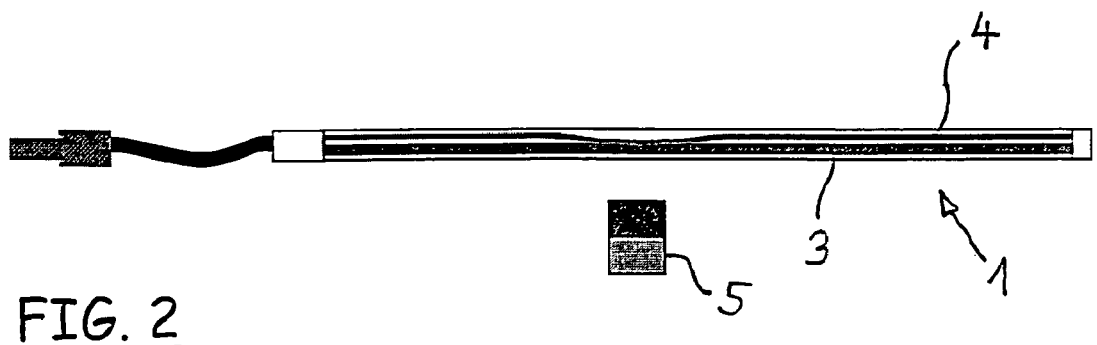
FIGS. 2 and 3 are diagrammatic side views illustrating operation of the sensor of FIG. 1.
Figure 3:
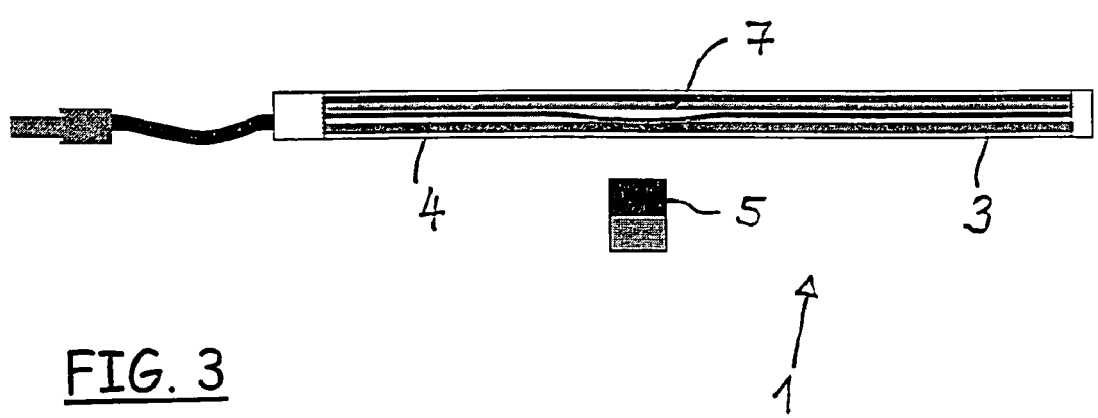

FIGS. 2 and 3 show different modes of operation of the position sensor 1. FIG. 2 shows that the contact layer 4 is pulled toward the resistive layer in the region of the magnet 5, since the one pole of the magnet 1 pulls the contact layer 4 toward the resistive layer 3. In this manner the deflection shown in FIG. 2 is created. FIG. 3 shows that the contact layer 4 is mounted on an edge spacer 7, and is thus pulled only transversely parallel to the spacer 7 toward the resistive layer 3 in the region of the permanent magnet 5. Therefore, if the magnet 5 is moved relative to the position sensor 1 (when viewing FIGS. 2 and 3 from the right or from the left) the magnet 5 attracts the contact layer 4 in the form of the film in a wave only in the region of the permanent magnet 5, and pushes it onto the resistive layer 3 such that the instantaneous position of the magnet 5 relative to the position sensor 1 may be detected.

Figure 4:
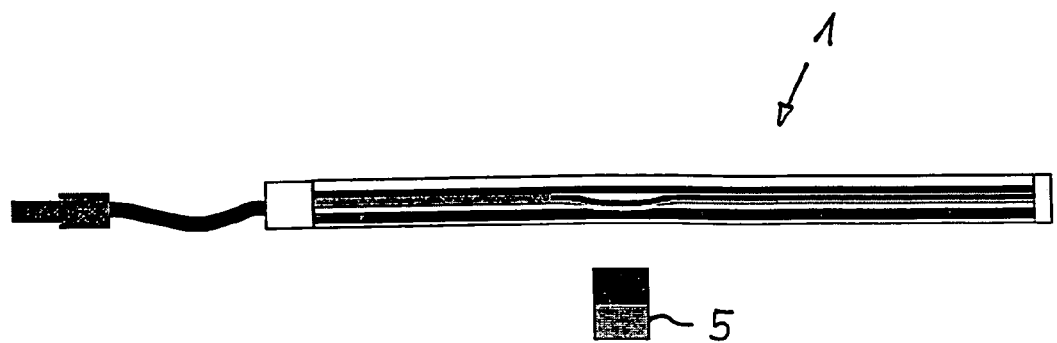
FIGS. 4, 5, and 6 are views of second, third, and fourth embodiments of the invention.

FIG. 4 shows that the position sensor 1 consists of a contact layer 4 that is magnetically held on the cover 6 consisting of a ferromagnetic material. This has the advantage that the edge spacer 7 according to FIG. 2 may be omitted. The permanent magnet 5 now attracts the film forming the contact layer 4 again as a defined wave only in the region of the magnet 5, and thus pushes it onto the resistive layer 3.

Figure 5:
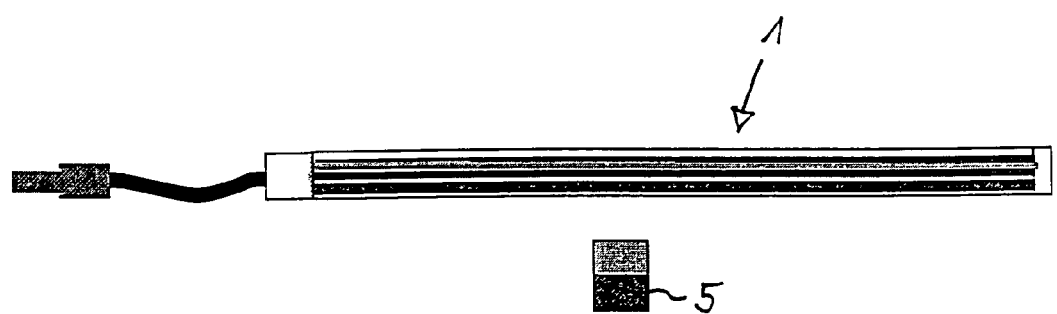

FIG. 5 shows the same construction, however, the pole of the magnet 5 is changed such that the magnetic field thereof pushes the contact layer 4 in the opposite direction, resulting in the fact that the contact layer 4 can be selectively pushed away from the resistive layer 3. This is of advantage, for example, if the pole changed permanent magnet 5 is moved once the entire longitudinal length of the position sensor 1 in order to set the contact layer 4 in a defined base position.

Figure 6:
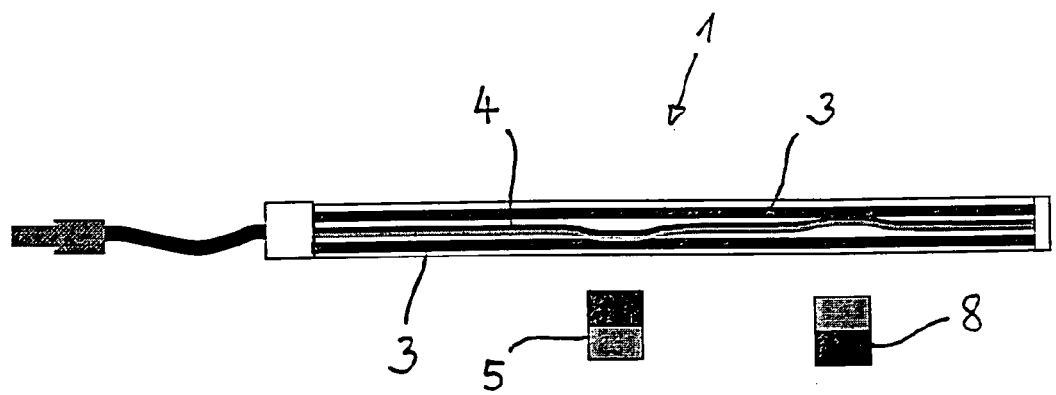

FIG. 6 shows a further permanent magnet 8 like the previously described configuration of the position sensor 1, but the polarity of the magnets 5 and 8 is opposite, and further two resistive layers 3 with a contact layer 4 between them are provided. Due to the reversed polarity of both magnets 5 and 8 the contact layer 4 is pushed or attracted, one to the lower and one to the upper resistive layer 3. In this manner the position of both magnets 5, 6 relative to the position sensor 1 can be detected.

Figure 7:
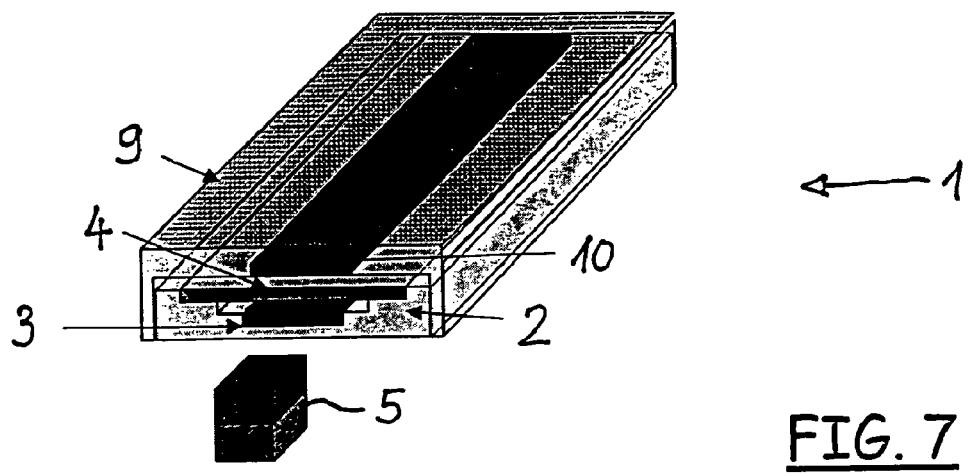
FIG. 7 is a diagrammatic perspective view of a sixth embodiment of the invention.

A further embodiment of the position sensor 1 is illustrated in FIG. 7 in cross section. It is obvious from the figure that two resistive layers 3 and 10 are present, between which the film contact layer 4 is mounted. To this end a spacing is provided between the contact layer 4 in the center and each of the resistive layers 3 and 10 such that the contact layer 4 is either pulled against the lower resistive layer 3 resting on the support 2 or pushed against the upper resistive layer 10 resting on the cover 9 on movement of the permanent magnet 5 relative to the position sensor 1 and as a function of the polarity of the magnet 5. The magnet 5 is, for example, a permanent magnet or an electromagnet, and may be shaped as a block, rod, ring, disk, or the like, depending on the position sensor 1.

Figure 8:
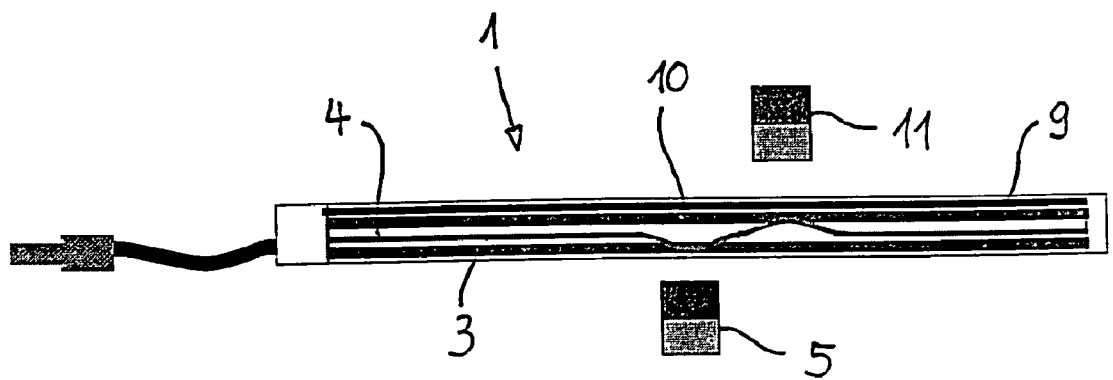
FIGS. 8, 9, and 10 are views of seventh, eighth, and ninth embodiments of the invention.

As in FIG. 7, FIG. 8 shows that again two resistive layers 3 and 10 are present, and the contact layer 4 mounted between them can be pulled or pushed by the magnets 5 and 11 provided above and below the position sensor 1.

Figure 9:
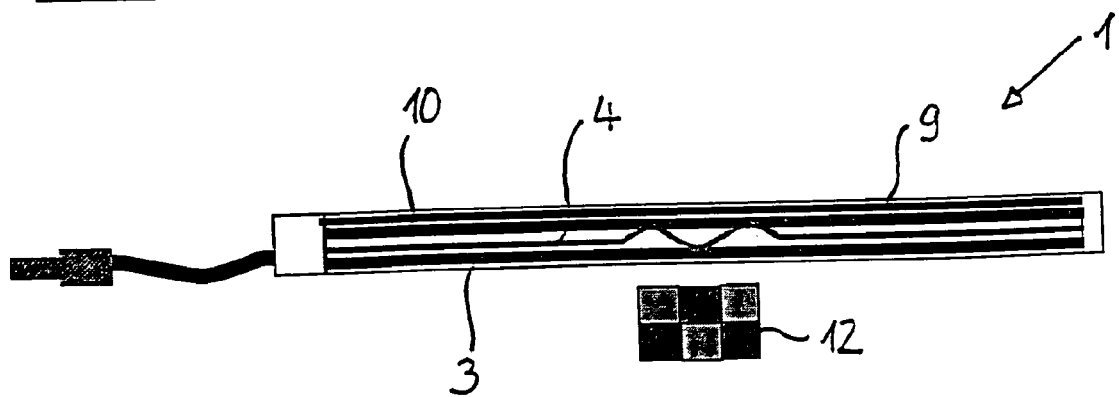

While only individual magnets 5, 8, and 11 have been shown in the above mentioned figures as each being provided on one side or on the same side of the position sensor, a single magnet 12 having an alternating pole sequence within the magnet 12 is shown in FIG. 9. The contact layer 4 is in turn either pulled or pushed to the lower resistive layer 3 or to the upper resistive layer 4 from the pole sequence within the single magnet 12.

Figure 10:
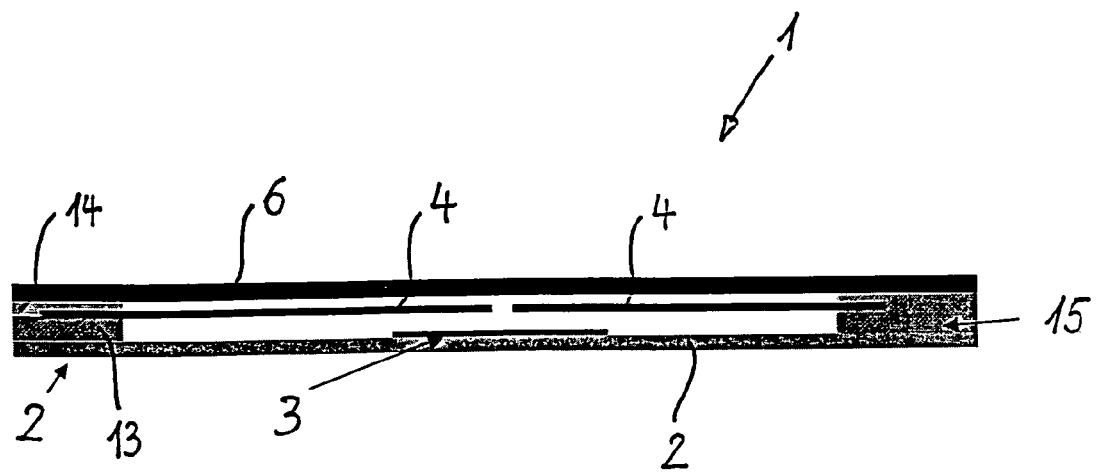

FIG. 10 shows a position sensor 1 in which the contact layer 4 is mounted between two spacers 13 and 14 held by the cover 6 and the support, or a single spacer 15 is provided that holds the resistive layer 4 on the support 2 or on the cover 6. The embodiment with the two spacers 13 and 14, or with the single spacer 15, corresponds to the embodiment shown in FIG. 3, while the embodiment illustrated in FIG. 10 has the characteristic that not only one contact layer 4 is defined on the support 2 or on the cover 6 by the spacers (either 13, 14, or 15), but that two contact layers 4 are provided that interact with the one resistive layer 3 (optionally also multiple resistive layers). This means that the planar contact layers 4 (or also just the one contact layer 4) is defined laterally between the lateral end of the support and the cover 6, floats freely in the region of the resistive layer 3, and is pulled toward the resistive layer 3 only upon by action of the magnet.

Figure 11:
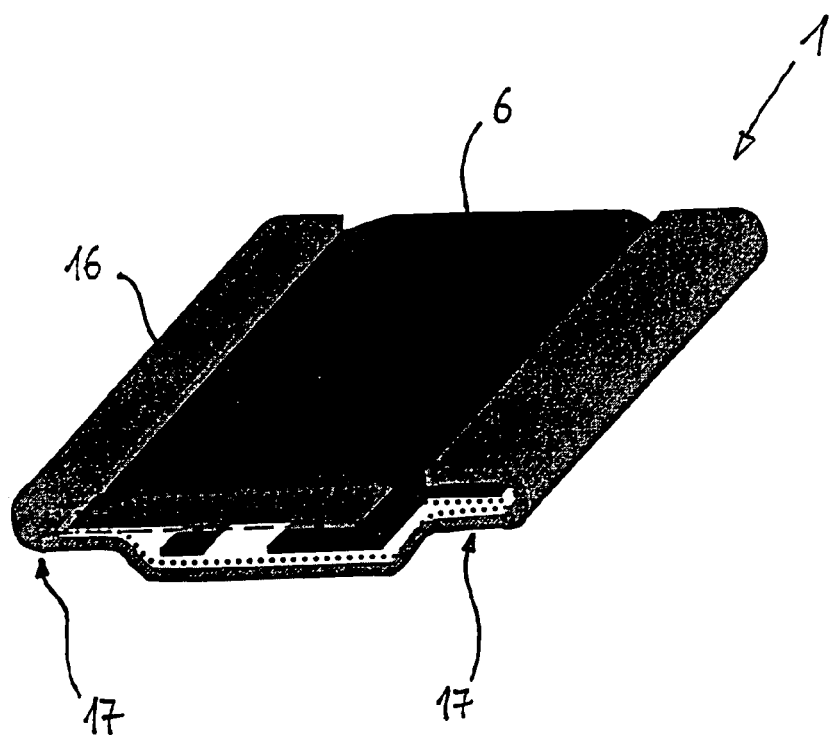
FIG. 11 is an end view of a tenth embodiment of the invention.

FIG. 11 shows the position sensor according to one of the embodiments as illustrated in FIGS. 1-10, this position sensor 1 having a protective housing 16 made of a nonmagnetic metal. It may be, for example, a metal such as aluminum, copper, brass, nickel silver, or the like. Such a protective housing 16 has the advantage that the position sensor 1 becomes substantially more robust, that the temperature stability thereof is increased, and that it may be used for purposes in accordance with protection category IP 69. The protective housing 16 partially or completely wraps around the position sensor 1 (as shown in FIG. 11), whereby according to the embodiment in FIG. 11 bent-over edges 17 are provided that enclose the longitudinal edges of the support 2 and the cover 6. As an alternative to the bent-over edges, the longitudinal edges may also be glued, soldered, welded, or the like, to each other.

Connection of the resistive layer 4 and of the contact layer 3 (sensor film) to the outside is carried out through a seal, for example, a heat seal, conductive adhesive, rivet connection, the bent-over edges shown, or comparable means or methods. As an alternative connection of the resistive layer 4 and of the contact layer 3 (sensor film) toward the outside may also be exposed through a conductive seal, soldering, welding, or the like.

Figure 12:
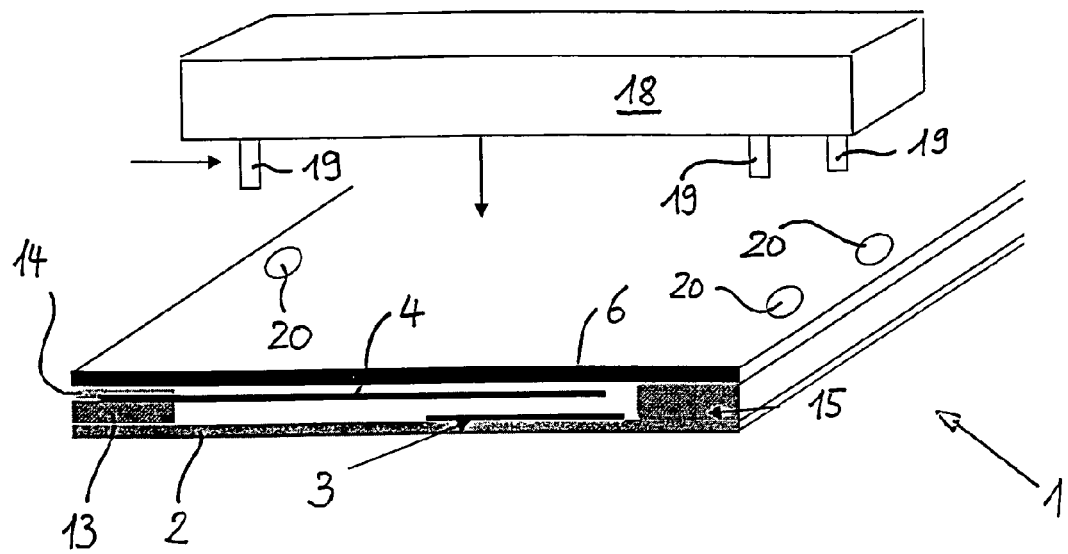
FIG. 12 is a diagrammatic perspective view of a variation of the ninth embodiment.

FIG. 12 shows a further embodiment of the position sensor 1. Similar to the arrangement of FIG. 1, this position sensor 1 has the support 2 with the resistive layer 3. The spacers 13 and 14 in which the contact layer 4 is clamped are shown at the ends. The one-piece spacer 15 is again provided on the opposite side. The cover 6 is provided atop the arrangement. As mentioned above, this basic configuration of the position sensor 1 may be produced in any desired form or with any desired length. In case a processing of the output signal of the position sensor 1 is desired, an interface 18 shown in FIG. 12, may be attached, in particular at the end of the position sensor 1. The interface 18 comprises a housing having an electronic analysis circuit (not illustrated) that in turn may be connected downstream of electronic devices via cable, plug-in connectors, or the like. In order to connect the electronic system provided in the interface 18, contacts 19, in this case, for example, contact pins, project out of the housing, openings 20 being provided on the side of the position sensor 1 that are created, for example, by die cutting. The position of the openings 20 corresponds to the contact pins 19, the openings 20 and the associated pins 19 each having mechanical and/or electrical functions depending on their positions with respect to the position sensor 1.

By installing an interface, such as a voltage interface, on connection, the sensor data may be made to comply with the different requirements of customer-specific analysis units. The sensor is thus also protected from overloads and switching errors caused by the customer. Furthermore, damage to a sensor may be detected, and reported to the analysis unit.

Figure 13:
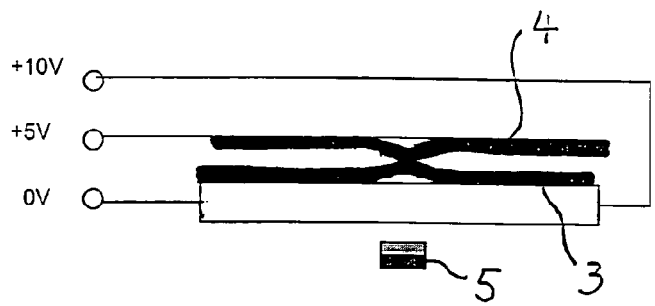
FIG. 13 is a diagrammatic view of an eleventh embodiment of the invention.
Figure 14:
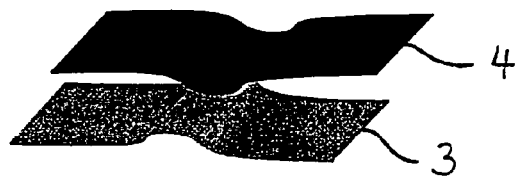
FIG. 14 is a perspective view illustrating a detail of FIG. 13.

FIGS. 13 and 14 illustrate a further embodiment of the position sensor 1. They again show the contact layer 4 and the resistive layer 3, the latter having a ferromagnetic core. This results in the fact that the action of the magnetic field of the permanent magnet 5 deforms both the resistive layer 3 and the contact layer 4 in the manner of a wave on relative movement of the permanent magnet 5. In this manner a potentiometer activated by a magnetic field is created, as shown in the embodiments of the previous figures. Since no contact looping occurs, but only an application of the trough, or peak of the resistive layer, or of the contact layer, wear is excluded. This means that the circuit in the engagement region of the resistive layer is actively closed and opened, resulting in the desired and detectable change of resistance.

The figures always show a permanent magnet 5 whose one pole points toward the position sensor 1 and whose other pole faces away from it. Furthermore, the magnet is always provided on the one or on the other side of the position sensor 1. As an alternative it is also possible with such a position sensor 1 in a longitudinal or other configuration that the magnet wraps around the position sensor 1 in a partially annular or annular, or geometrically complementary configuration (such as in the shape of a horseshoe). It is further conceivable to arrange the poles on the position sensor 1 in a distorted manner to the alignment shown by 90°, either longitudinally or transversely. In addition to the alignment of the poles of the magnet parallel or transverse to the axis of the position sensor 1 other arrangements deviating from it (alignment at an angle) are also conceivable that, however, do not represent the preferred alignment, since the forces effective on the contact layer are the greatest with alignment of the poles of the magnet parallel or transversely to the axis of the position sensor 1.

The invention claimed is:

1. A magnetic position sensor comprising:
a dielectric and nonmagnetic support;
a cover through which magnetic flux can pass carried on and spaced from the support;
a resistive layer carried on the support and spaced from the cover;
a ferromagnetic and electrically conductive contact layer carried on the support, spaced from and at least partially overlying the resistive layer, and deflectable from a normal rest position resting against the cover and out of contact with the resistive layer and a position pulled away from the cover and engaging the resistive layer; and
a magnet juxtaposed with and movable along one of the layers, spacing between the layers in the rest position of the contact layer being such that contact is made between the resistive layer and the contact layer only adjacent the magnet as a result of the magnet pulling the contact layer away from the cover.

2. The position sensor according to claim 1 wherein the cover is or has a flux-conducting plate.

3. The position sensor according to claim 1 wherein the contact layer is mounted on the support or on the cover via an edge spacer.

4. The position sensor according to claim 1 wherein the contact layer is magnetically held on the cover in an at least partially detached manner, and the cover consists of a ferromagnetic material.

5. The position sensor according to claim 1 wherein at least two contact layers are provided that interact with the resistive layer.

6. The position sensor according to claim 1 wherein the contact layer is held between two spacers, or is held by one spacer on the cover and/or the support.

7. The position sensor according to claim 6 wherein the protective housing has bent-over edges on the sides that laterally envelope the cover and/or the support.

8. The position sensor according to claim 6 wherein the protective housing consists of two parts, the position sensor being mounted between the two parts and the protective housing being closed on the edges by gluing, soldering, welding, or caulking.

9. The position sensor according to claim 1 wherein the position sensor has a protective housing made from a non-magnetic metal.

10. The position sensor according to claim 1 wherein the position sensor is equipped with an interface.

11. A position sensor comprising:
an elongated support defining a longitudinally extending and laterally open groove;
a longitudinally extending resistive strip fixed to the support in the groove;
a magnetic cover through which magnetic flux can pass covering the groove at a transverse spacing from the resistive strip;
a ferromagnetic and electrically conductive contact strip between the resistive strip and the cover and normally clinging magnetically to the cover at a transverse spacing from the resistive strip; and
a magnetic movable longitudinally along the cover and capable of pulling the contact strip off the cover and into electrical engagement with the resistive strip.

12. A position sensor comprising:
an elongated support defining a longitudinally extending and laterally open groove;
a longitudinally extending resistive strip fixed to the support in the groove;
a cover through which magnetic flux can pass covering the groove at a transverse spacing from the resistive strip;
a pair of longitudinally spaced ferromagnetic and electrically conductive contact strips between the resistive strip and the cover and normally engaging the cover at a transverse spacing from the resistive strip; and
a magnetic movable longitudinally along the cover and capable of pulling the contact strips off the cover and into electrical engagement with the resistive strip.

* * * * *